United States Patent
Burt et al.

(10) Patent No.: US 10,532,469 B2
(45) Date of Patent: Jan. 14, 2020

(54) OPERATING DEVICE FOR A TUBE LIFTER AND TUBE LIFTER

(71) Applicant: J. Schmalz GmbH, Glatten (DE)

(72) Inventors: Hans Burt, Horb a.N. (DE); Jan Gauss, Freudenstadt (DE)

(73) Assignee: J. Schmalz GmbH, Glatten (DE)

( * ) Notice: Subject to any disclaimer, the term of this patent is extended or adjusted under 35 U.S.C. 154(b) by 0 days.

(21) Appl. No.: 16/281,234

(22) Filed: Feb. 21, 2019

(65) Prior Publication Data
US 2019/0275684 A1    Sep. 12, 2019

(51) Int. Cl.
*B25J 15/06*      (2006.01)
*B66C 1/02*      (2006.01)

(52) U.S. Cl.
CPC ......... *B25J 15/0616* (2013.01); *B66C 1/0212* (2013.01); *B66C 1/0256* (2013.01); *B66C 1/0293* (2013.01)

(58) Field of Classification Search
CPC ... B66C 1/0293; B66C 1/0616; B66C 1/0256; B66C 1/0212
USPC ........................................ 294/185, 186, 188
See application file for complete search history.

(56) References Cited

U.S. PATENT DOCUMENTS

| | | | | |
|---|---|---|---|---|
| 2,874,989 A | * | 2/1959 | Reynolds .............. | B66C 1/0212 294/64.2 |
| 3,696,596 A | * | 10/1972 | Wegscheid ............ | A01D 45/00 56/327.1 |
| 4,412,775 A | * | 11/1983 | Molitor ................. | B66C 1/0212 414/626 |
| 4,413,853 A | * | 11/1983 | Andersson ............ | B66C 1/0293 294/186 |
| 4,557,659 A | * | 12/1985 | Scaglia .................. | B65G 47/91 254/270 |

(Continued)

FOREIGN PATENT DOCUMENTS

| | | |
|---|---|---|
| DE | 1778580 U | 11/1958 |
| DE | 3934922 A1 | 4/1991 |

(Continued)

OTHER PUBLICATIONS

Search Report for EP Application No. 18 16 0918, filed Mar. 9, 2019, pp. 1-5, date of search Sep. 13, 2018.

*Primary Examiner* — Paul T Chin
(74) *Attorney, Agent, or Firm* — Bond Schoeneck & King, PLLC; George McGuire (57) ABSTRACT

The invention relates to an operating device for a tube lifter having a suction grip device arranged on one end of the lifting tube, the operating device having a suction port for fluid communication with the suction grip device, a lifting tube port for fluid communication with the tube interior of the lifting tube, and a valve means for controlling the fluid communications, the valve means comprising a blocking member, a ventilation valve and a control valve, the valve means being designed such that the control valve is adjustable independently of the position of the blocking member and the valve means being designed such that when the ventilation valve is shifted into the ventilation position the blocking member always closes off the flow path between the tube interior and the suction grip device. The invention also relates to a tube lifter comprising an operating device of this kind.

13 Claims, 6 Drawing Sheets

(56) References Cited

U.S. PATENT DOCUMENTS

| | | | | |
|---|---|---|---|---|
| 4,749,219 A | * | 6/1988 | Bolle, Jr. | B25J 15/0616 |
| | | | | 271/103 |
| 5,330,314 A | * | 7/1994 | Bennison | B66C 1/0212 |
| | | | | 294/186 |
| 5,928,537 A | * | 7/1999 | Fortune | H05K 13/0447 |
| | | | | 219/228 |
| 6,076,872 A | * | 6/2000 | Harter | B65G 47/917 |
| | | | | 294/186 |
| 6,264,259 B1 | * | 7/2001 | Fortune | B25B 11/007 |
| | | | | 294/186 |
| 6,367,855 B1 | * | 4/2002 | Schmalz | B25J 15/0616 |
| | | | | 294/186 |
| 9,061,868 B1 | * | 6/2015 | Paulsen | B66C 1/0218 |
| 9,415,975 B2 | * | 8/2016 | Lundin | B66C 1/0212 |

FOREIGN PATENT DOCUMENTS

| | | |
|---|---|---|
| DE | 102008028205 C5 | 3/2015 |
| DE | 202016104731 U1 | 9/2016 |
| WO | 8102289 A1 | 8/1981 |
| WO | 2007094720 A1 | 8/2007 |

* cited by examiner

OPERATING DEVICE FOR A TUBE LIFTER AND TUBE LIFTER

CROSS-REFERENCE TO RELATED APPLICATION

The present application claims priority to European Patent Application No. 18-160-918.1-1017, filed on Mar. 9, 2018, the entire contents of which are incorporated herein by reference in its entirety.

BACKGROUND

The invention relates to an operating device and to a tube lifter which is equipped with an operating device of this kind.

Tube lifters are vacuum handling devices by means of which loads can be grasped, lifted and optionally moved by means of a vacuum. The lifting force is exerted by means of a lifting tube, i.e. a tube that is generally formed in the manner of bellows, is reversibly deformable along its longitudinal extension, can be shortened by applying a vacuum to the tube interior thereof and can be extended again by releasing the vacuum prevailing therein. A suction grip device is generally attached at one end of the lifting tube. The vacuum required for the suction grip device is generally provided by the vacuum prevailing in the lifting tube.

In order to operate the lifting tube, in particular to adjust the vacuum prevailing in the lifting tube, and if required to release said vacuum by a controlled inflow of ambient air, various operating devices are known. The vacuum state in the suction grip device of the tube lifter is generally also controlled by means of the operating devices. Operating devices of this kind generally comprise one or more valve means.

WO 81/02289 A1 discloses a tube lifter comprising a two-step valve means. By actuating a control lever, initially a first valve opening is gradually opened such that ambient air flows into the lifting tube in a controlled manner and the lifting tube can extend. If the control lever is further actuated, an additional ventilation opening is opened such that the lifting tube and the suction grip device are extensively ventilated.

DE 10 2008 028 205 C5 discloses an operating device for tube lifters comprising a handle which has a manually actuable trigger. When the trigger is actuated, first a control valve is opened, by means of which an inflow of ambient air into the lifting tube is controlled. Upon further actuation beyond a pressure point, a second ventilation means is opened, which allows a considerable inflow of ambient air. This additional ventilation of the suction gripper ensures the workpiece is released.

Operating devices of this kind allow intuitive operation, in which first the lifting tube is ventilated and as a result an extension of the lifting tube is initiated under the action of the gravitational force of the load. Only when the corresponding control element is further actuated is complete ventilation carried out, which allows the suctioned object to be released. However, in the ventilated state the lifting tube can no longer be shortened and extended in a controlled manner, but rather remains initially in its extended state.

WO 2007 094 720 A1 describes a tube lifter comprising an operating device which has the features of the preamble of claim 1. A control valve for admitting ambient air into the lifting tube is controlled by means of an operating slide on the handle. Moreover, a separate lever is provided, by means of which a ventilation valve can be opened. The control valve is actuable independently of the remaining valves. The lifting tube and the suction grip device can be extensively ventilated by actuating the lever.

In the known devices, additional ventilation through the ventilation valve can lead to undesired changes in length of the lifting tube. This is problematic in particular if a suctioned object is intended to be released and the lifting tube simultaneously changes its length. As a result, the placed workpiece can tilt or slip, for example.

Moreover, there is a risk that rapid ventilation may cause the suction grip device and the held load to be lowered too quickly. It cannot be ruled out that, in an extreme case, the load is unintentionally released by full actuation of the control element. In particular, if a load has been held at a great height, damage to the load may occur and/or bystanders may be injured.

SUMMARY OF THE INVENTION

The present invention addresses the problem of improving the operational safety and reliability for a tube lifter.

This problem is solved by an operating device according to claim 1. The operating device is configured to operate a tube lifter. A tube lifter of this kind has a lifting tube which encloses a tube interior. By applying a vacuum to the tube interior, the lifting tube can be reversibly shortened, and can be correspondingly extended again by supplying air (e.g. ambient air) into the tube interior. A suction grip device is attached at one end of the lifting tube, which device is supplied with a vacuum through the tube interior. The other end of the lifting tube is in particular arranged on a suitable carrier or frame.

The operating device has a suction port for fluid communication with the attached suction grip device and a lifting tube port for fluid communication with the tube interior of the attached lifting tube. Moreover, the operating device can have at least one inlet from the surroundings for the inflow of air from the surroundings. Said inlet can be formed, for example, by openings in a housing of the operating device. The operating device further comprises a valve means for controlling the various fluid communications, i.e. in particular the fluid communication between the lifting tube and the suction grip device as well as the fluid communication between the lifting tube and the surroundings and between the suction grip device and the surroundings.

The valve means comprises in particular three functional units for providing valve functions. A blocking member is provided, which can assume various positions and, depending on its position, closes off or opens a flow path between the lifting tube port and the suction port. In addition, a ventilation valve is provided, which can be shifted into a hold position and into a ventilation position, in the ventilation position the flow path between the surroundings and the suction grip device being open, and in the hold position said flow path being largely closed (in particular sealingly closed). In addition, a control valve is provided, which is adjustable between a closed position and an open position, in the open position a flow path from the tube interior to the surroundings being open, and in the closed position said flow path being substantially closed. In this case, the valve means is designed such that the control valve is also adjustable independently of the position of the blocking member.

The valve means is additionally designed such that the blocking member is forcibly coupled to the ventilation valve, specifically to the extent that when the ventilation valve is shifted into the ventilation position it is automatically ensured that the blocking member closes off the flow path between the tube interior and the suction grip device.

Using said operating device, the length of the lifting tube can thus be adjusted by means of the control valve. The flow path controlled by the control valve has in this respect a defined flow resistance, which affects the control behavior of the lifting tube. In particular, said flow resistance is such that even in the open position the lifting tube is not suddenly ventilated and does not slump downward due to the gravitational force, but rather the lifting tube is extended slowly and in a controlled manner due to the interaction between the vacuum supply of the lifting tube and the inflow of air due to the flow resistance of the control valve and the acting gravitational force.

By opening the ventilation valve, the attached suction grip device is directly ventilated in any case, and a suctioned object is thus reliably released. It is in particular not necessary for the suction grip device to have to be tipped or pried off from the surface of the object against a residual suction force. This is sometimes the case for known operating devices and is problematic in particular when handling objects that are stacked high, since an operator then has to work with an unfavorable work posture.

Since the control valve is adjustable independently of the position of the blocking member, the length of the lifting tube remains adjustable in a controlled manner by means of the control valve, even if the suction cup is ventilated by the ventilation valve. Since the blocking member also always closes upon ventilation, an undesired change in length of the lifting tube can be prevented. In contrast to some known solutions, air does not additionally enter into the lifting tube by means of the ventilation of the suction grip device. As a result, the operational safety and reliability of the tube lifter is increased.

In order to avoid unintentional ventilation, a safety mechanism can be provided which interacts with the control valve and the ventilation valve such that the ventilation valve can only be shifted into the ventilation position when the control valve is already adjusted into the open position. As a result, the risk of dropping a suctioned object from a great height is minimized.

In order to produce the coupling between the ventilation valve and the blocking member, a common, manually actuable operating element can be provided for the blocking member and the ventilation valve. Said operating element acts jointly on the ventilation valve and the blocking member to the extent that, when the operating element is actuated, the blocking member closes off the flow path between the tube interior and the suction grip device and the ventilation valve is simultaneously shifted into the ventilation position. If the operating element is not actuated, it assumes a rest position, in the rest position the ventilation valve being in its hold position and the blocking member opening the flow path between the tube interior and the suction grip device. In particular, the operating element is pretensioned toward its rest position by means of a spring means, i.e. can be actuated out of the rest position only against a restoring force.

In another embodiment, the operating element is mechanically blocked against actuation unless the control valve is adjusted into its open position. For example, a mechanical stop for the operating element is provided, which is only moved away when the control valve is adjusted into its open position.

The mentioned safety mechanism can be achieved, for example, via a coupling of the respective actuating elements (e.g. slide, trigger, catch). For example, to actuate the control valve, a control element is provided (e.g. slide, trigger) which is manually, continuously actuable between a neutral position and an end position. When actuating the control element starting from the neutral position toward its end position, the control valve is shifted from the closed position toward the open position. In order to implement the safety mechanism, a pivotable or movable safety catch can then be additionally provided which can assume a blocking position in which said catch mechanically blocks the operating element for the ventilation valve against actuation. In addition, a movable coupling element can be provided, which interacts with the control element for the control valve and the safety catch for the ventilation valve such that the safety catch is pivoted or moved out of its blocking position when the control element is adjusted into its end position.

For example, the control element can have a pin or projection which extends within a slot in the coupling element and abuts one end of the slot only in the end position, and the coupling element is thus moved in order to pivot or move the safety catch out of the blocking position.

The common operating element for the blocking member and the ventilation valve and the control element for the control valve are preferably separately arranged on the operating device, in particular so as to be spatially separated from one another. However, the two elements are preferably arranged on the operating device such that both elements can be operated by an operator, in particular both elements can be operated using the same hand.

It is also conceivable for the ventilation valve and the blocking member to be mechanically forcibly intercoupled within the valve means. As a result, it can be ensured that by adjusting the ventilation valve into the ventilation position, the blocking member is also automatically shifted into the position in which the flow path between the lifting tube and the suction grip device is closed off.

A reliable embodiment is produced in which the ventilation valve is not designed to be continuously shiftable but rather is provided by a valve that can be discretely switched into the hold position and ventilation position.

Likewise, the blocking member can be designed as a blocking member that cannot be continuously shifted and can only be discretely switched into two positions.

The discrete embodiments for the ventilation valve and/or blocking member have the advantage that the precision of the control by the control valve is not impaired, for example by air additionally flowing into the lifting tube due to positions of the ventilation valve and/or blocking member that are not uniquely defined. In this respect, said operating device allows high-precision control.

In a particularly preferred embodiment, the valve means has a 3/2-way valve, which provides both the blocking member and the ventilation valve. The 3/2-way valve has by definition three ports, one port being in fluid communication with the suction port, another port being in fluid communication with the surroundings, and a third port being in fluid communication with the control valve and/or the lifting tube port. In the hold position, the suction port is connected via the 3/2-way valve to the lifting tube port and/or the control valve. In the ventilation position, the suction port is connected to the surroundings via the 3/2-way valve and the communication or flow path from the lifting tube port to the suction port is simultaneously closed off.

As mentioned at the outset, the control valve is largely adjustable independently of the blocking member. In particular, the control valve can also be shifted into the open position when the blocking member closes off the flow path between the tube interior and the suction grip device. The control valve is also preferably adjustable back toward the closed position again. In this respect, the lifting tube also remains completely controllable during ventilation of the suction grip device.

According to an advantageous aspect of the invention, the control valve, the blocking member and the ventilation valve are functionally connected in series between the lifting tube port and the suction port, i.e. the mentioned units act in succession along the flow path from the lifting tube port to the suction port. In particular, starting from the lifting tube port, the ventilation valve is arranged first and allows a controllable admission of air to the lifting tube port. Next, following the flow path, the blocking element is arranged in order to close off or open the flow path between the lifting tube port and the suction port in a controlled manner. Finally, the ventilation valve follows, in order to supply air in a controlled manner for ventilating the suction port. The lifting tube together with the tube interior thereof and the connected suction grip device, considered as a whole, form a global vacuum system having two functional vacuum regions: the lifting tube system, by means of the pressure state of which the shortening or the extension of the lifting tube is controlled, and the grip system having the suction grip device (the suction grip device forms, together with a surface to be suctioned, a suction chamber, meaning that the surface can be suctioned by means of a vacuum in the suction chamber). Owing to the coupling between the blocking member and the ventilation valve, the two functional regions can either be separated from one another (ventilation position of the ventilation valve and simultaneously closing off the flow path by means of the blocking member), or interconnected to form a common vacuum system (hold position). In the ventilation position, the suction gripper is functionally separated from the lifting tube and does not affect the vacuum in the lifting tube.

The operating device advantageously has a handle, which is in particular ergonomically designed and can be grasped by an operator (preferably by one hand). The common operating element for the blocking member and the ventilation valve is preferably arranged on the handle. The actuable control element for adjusting the control valve is preferably also arranged on the handle.

The problem mentioned at the outset is also solved by a tube lifter of the mentioned type, said tube lifter being equipped with the above-described operating device. In this case, the operating device is connected to the suction grip device via the suction port thereof and to the lifting tube of the tube lifter via the lifting tube port thereof.

BRIEF DESCRIPTION OF THE DRAWINGS

The invention will be explained in more detail in the following with reference to the drawings, in which.

DETAILED DESCRIPTION

In the following description and in the drawings, the same reference signs are used in each case for identical or corresponding features.

Figure 1:
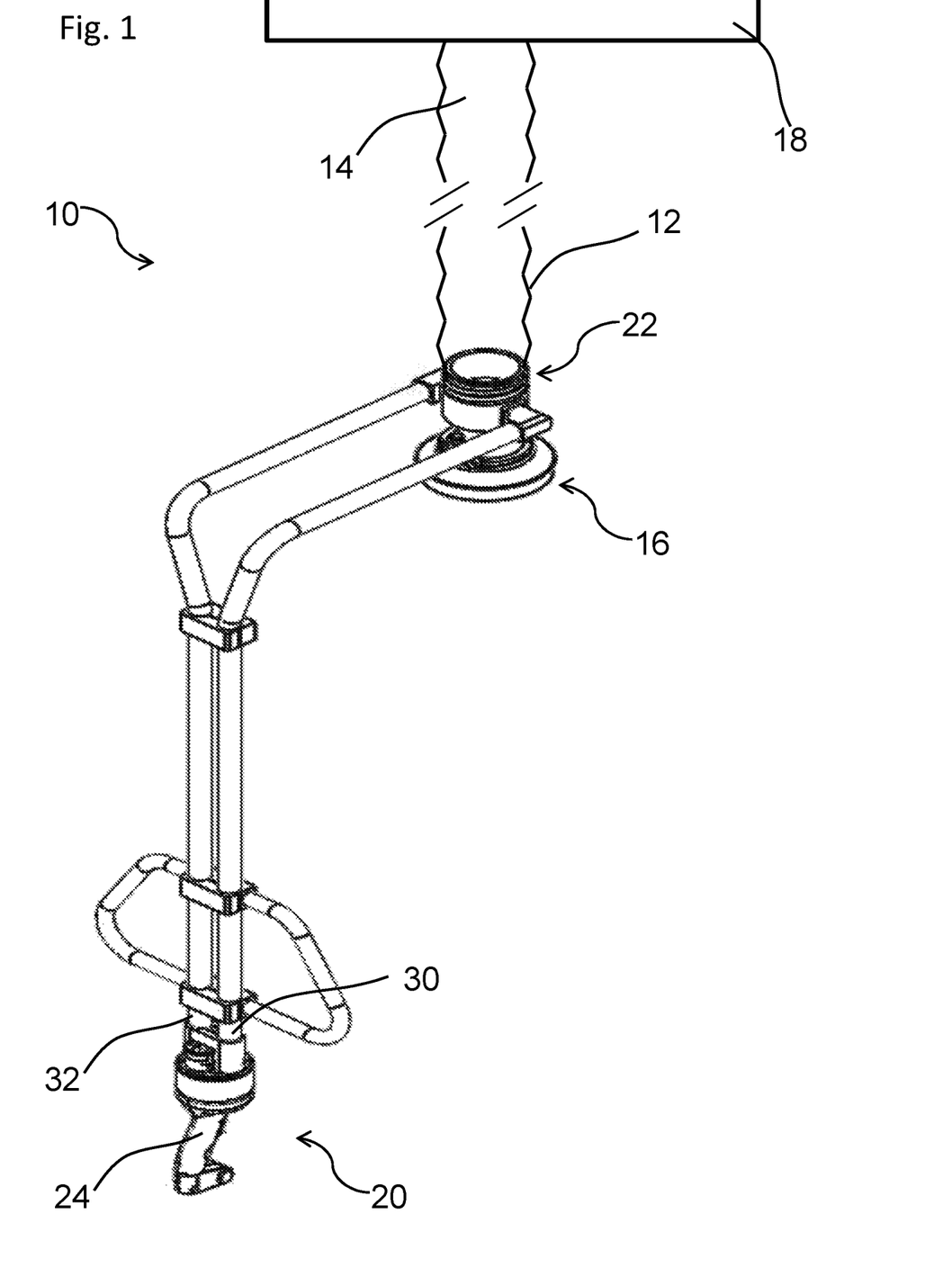
FIG. 1: is a sketch of a tube lifter comprising an operating device.

FIG. 1 shows a sketch of a tube lifter 10 comprising a reversibly extendable and shortenable lifting tube 12. The lifting tube 12 encloses a tube interior 14, in which a vacuum is produced by means of a vacuum supply (not shown in more detail) in the operating state. Depending on the pressure level in the tube interior 14, the lifting tube is reversibly shortened or extended, for example under the action of gravitational force.

The lower end of the lifting tube 12 is connected to a suction grip device 16, which is supplied with a vacuum through the lifting tube 12. The lifting tube 12 is connected to a carrier or frame 18 by means of its upper end which is opposite the suction grip device 16. By shortening the lifting tube 12, the suction grip device 14 and an object (not shown) suctioned by the suction grip device 14 can thus be lifted.

Figure 2:
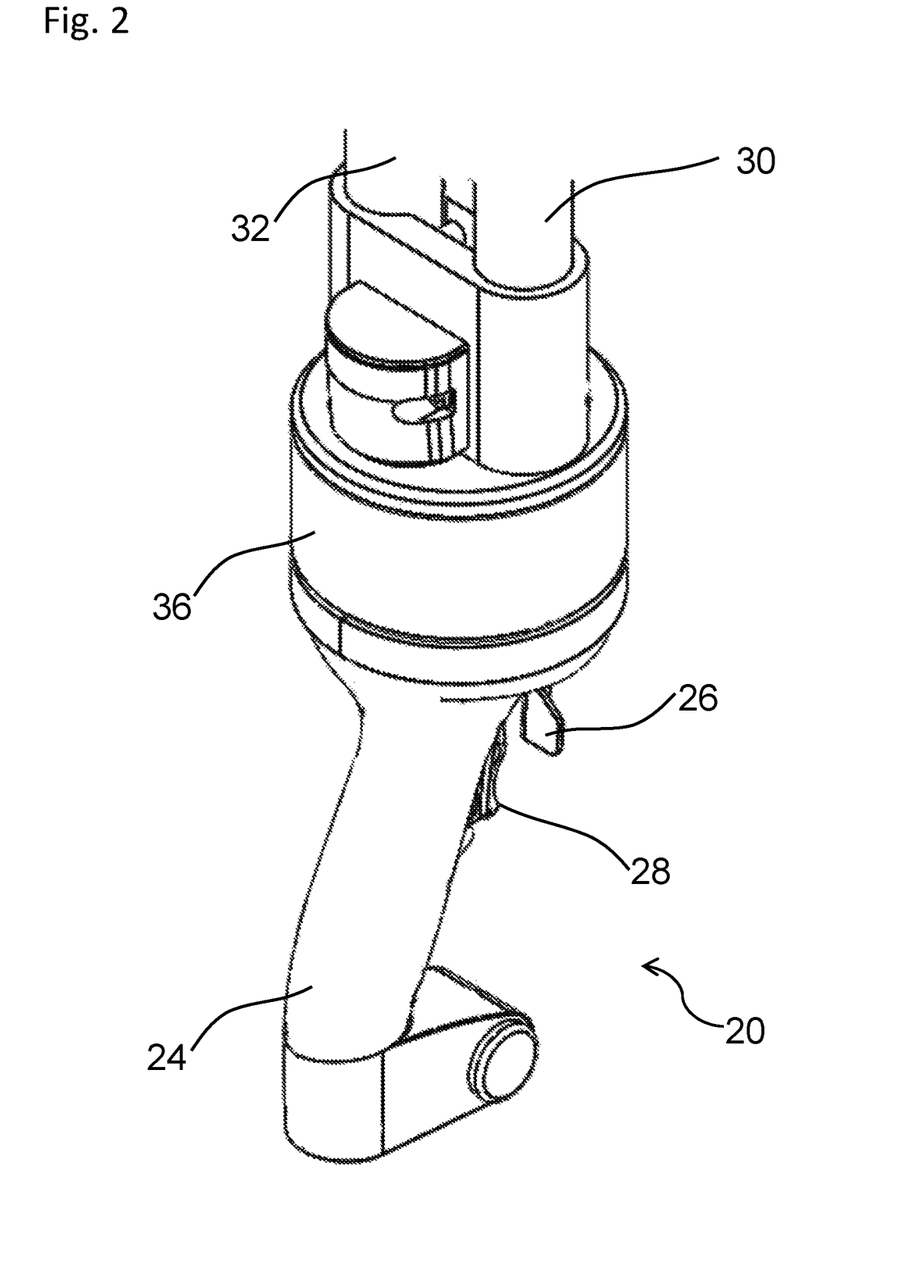
FIG. 2: is a detailed view of the operating device from FIG. 1.

In order to operate and control the lifting tube 12 and the suction grip device 14, an operating device 20 is provided (detailed view cf. FIG. 2)

In the example shown, the operating device 20 has a port portion 22 which is mechanically connected to the lifting tube 12 and the suction grip device 14. In this case, the connection is designed in particular such that fluid communications between the tube interior 14 and the suction grip device 16, between the tube interior 14 and the surroundings, and between the suction grip device 16 and the surroundings, can also be controlled by means of the operating device 20. For this purpose, the operating device 20 has a valve device, which is described in more detail further below with reference to FIG. 3-8.

As can be seen in FIGS. 1 and 2, the operating device 20 has a handle 24 and two separate operating means: an operating element 26 and a control element 28, the function of which is described in more detail in the following. In this case, the handle 20 is in particular shaped in such a way that an operator can grasp said handle with one hand and in so doing can actuate the operating element 26 and the control element 28 with one hand (e.g. using the index finger and/or the middle finger).

Figure 3:
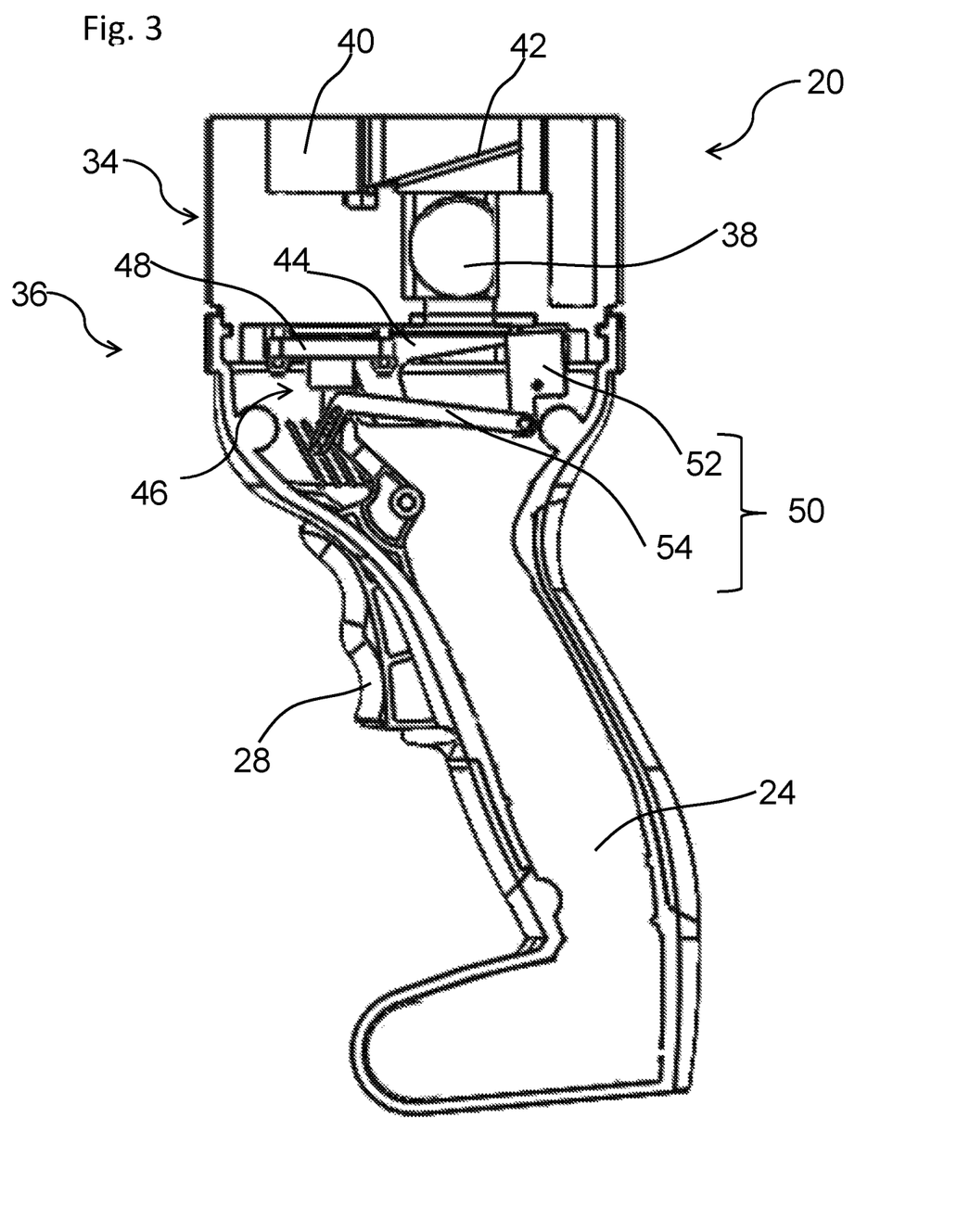
FIG. 3: is a sectional view of the operating device with a closed control valve and a closed ventilation valve.
Figure 4:
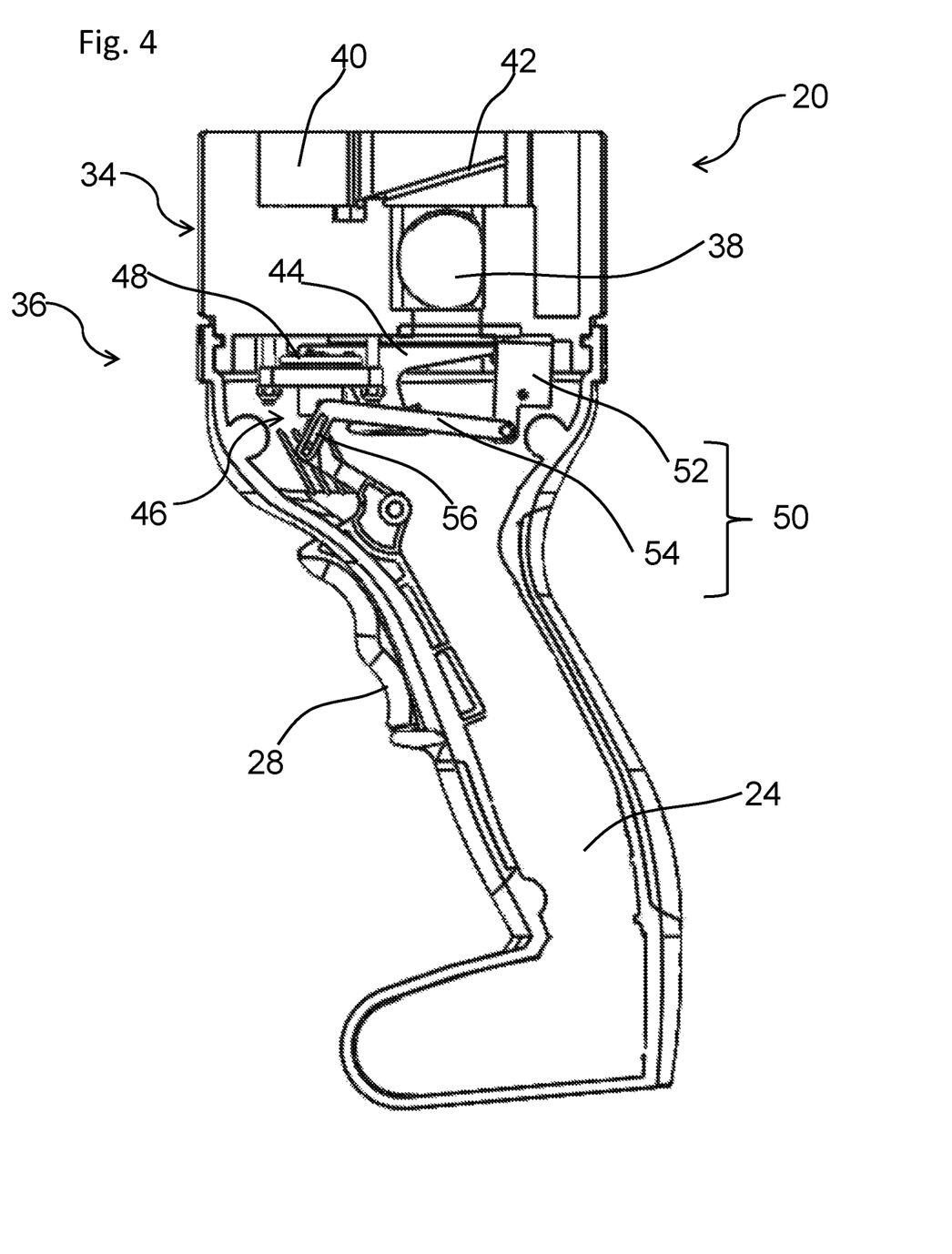
FIG. 4: is a sectional view of the operating device with the control valve open.
Figure 5:
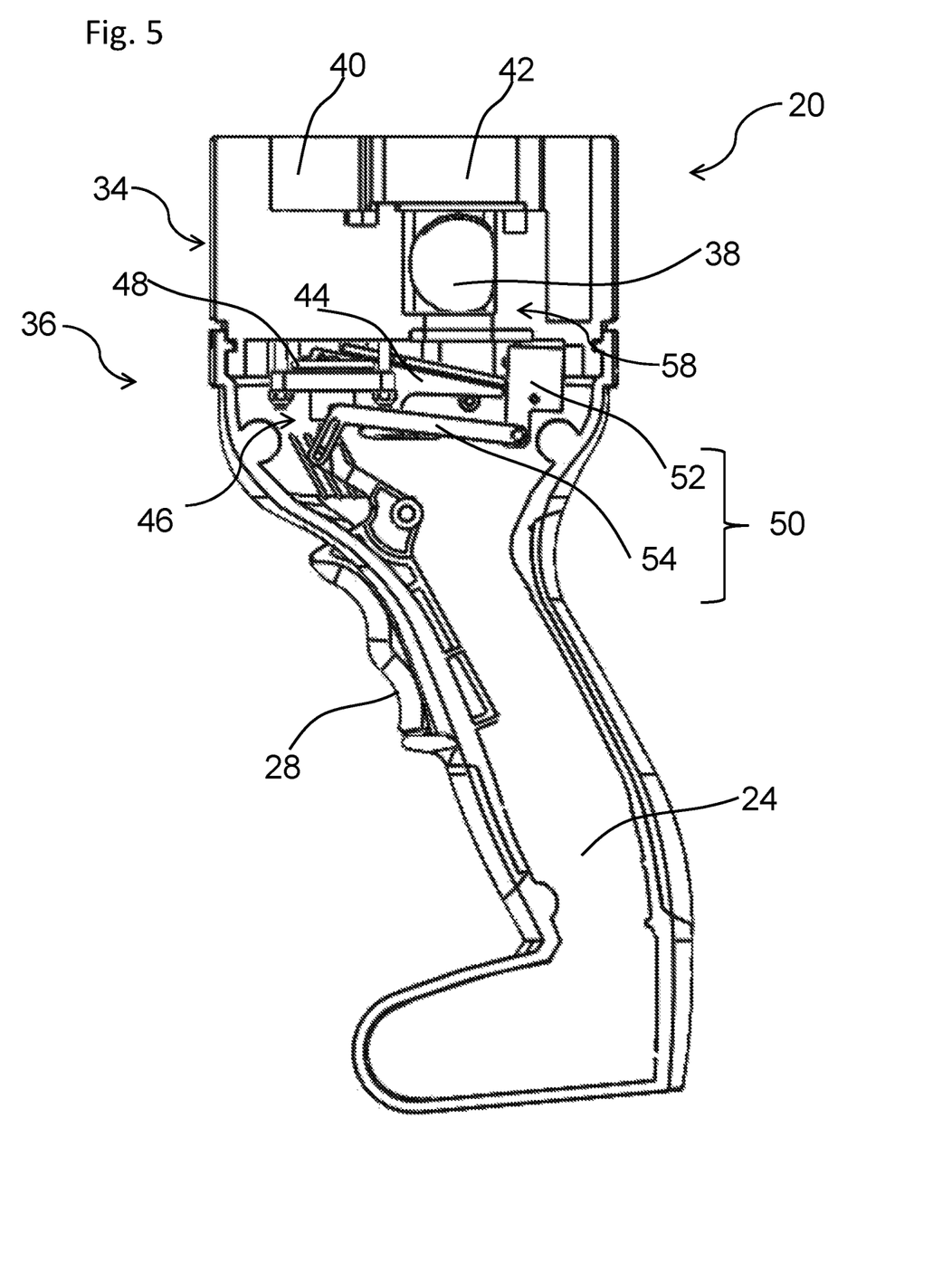
FIG. 5: is a sectional view of the operating device with the control valve open and the ventilation valve open and with a closed blocking member.

The control element 28 is formed, for example, in the manner of a pistol trigger which, starting from a neutral position (cf. FIG. 2 and FIG. 3), is continuously depressible toward an end position (cf. FIGS. 4 and 5). In particular, the control element 28 is pretensioned in its neutral position and can only be depressed against a restoring force.

The operating element 26 is, for example, formed in the manner of a pushbutton and can be depressed starting from a rest position. In particular, the operating element 26 is pretensioned in its rest position and can only be actuated starting from the rest position against a restoring force.

The operating device 20 has a suction port 30 which, in the example shown, is connected to the port portion 22 by means of a tubular connecting line and is used for the fluid communication with the attached suction grip device 16. Moreover, the operating device 20 has a lifting tube port 32 which is used (in the example shown again via the port portion 22) for the fluid communication with the attached lifting tube 12 (more precisely with the tube interior 14). The operating device 20 further has an inlet from the surroundings (not shown in more detail) which can be formed, for example, by corresponding apertures or openings in the region of the handle 24.

In the operating device 20 shown, the port portion 22 is spatially spaced far apart from the handle 24. In particular, the tubular connecting lines run between the port portion 22 and the handle such that, when the tube lifter 10 is in operation, the suction grip device 16 is positioned so as to be vertically offset (above) the handle. This embodiment makes it possible, by means of the tube lifter, to pick up and place down objects that are stacked high.

The operating device 20 further has a valve means 36, which is explained in more detail with reference to FIGS. 5 to 8. In the example shown, essential components of the valve means 36 are arranged in a valve housing portion 34 of the operating device 20 (cf. FIG. 2).

FIGS. 3 to 5 are longitudinal sectional views of the operating device 20 in the region of the handle 24. The valve means 36 can be seen in detail here. The operating principle of the valve means 36 is additionally shown by the diagrams of FIGS. 6 to 8.

The sectional views according to FIGS. 3 to 5 show a transverse hole 38 into which the suction port 30 in the valve housing portion 34 leads. The lifting tube port 32 opens into a channel 40 within the valve housing portion 34.

The flow path between the channel 40 and the transverse hole 38 can be opened or closed off by means of a blocking member 42. In the example shown, the blocking member 42 is formed as a valve flap which in its open position (FIGS. 3 and 4 or FIGS. 6 and 7) opens the communication between the suction port 30 and the lifting tube port 32, and in its closed position (see FIG. 5 or FIG. 8) closes off the communication between the lifting tube port 32 and the suction port 30 (e.g. rests against a corresponding sealing seat, which is not shown in more detail for the sake of clarity).

In addition, a ventilation valve 44 is provided, by means of which a flow path from the suction port 30 through the transverse hole 38 to the surroundings can be opened or closed off. In the embodiment shown, the ventilation valve 44 also has a valve flap which opens or closes off the mentioned flow path. The ventilation valve can in this respect assume a hold position (shown in FIGS. 3 and 4 or 6 and 7) in which the flow path between the suction port 30 and the surroundings is closed. In contrast, the ventilation valve 44 can assume a ventilation position (shown in FIG. 5 or FIG. 8) in which the flow path between the suction port 30 and the surroundings is open.

The valve means 36 further comprises a control valve 46 comprising a movable valve body 48 which can rest against a sealing seat (not shown in more detail) or can be moved away from said seat. The control valve 46 is adjustable between an open position (shown in FIGS. 4, 5 and 8) and a closed position (shown in FIGS. 3 and 6). In the closed position, the valve body 48 closes a flow path between the lifting tube port 32 (through channel 40) and the surroundings. In the open position, said flow path is largely open.

The control valve 46 is in particular continuously adjustable between the open position and the closed position by means of the control element 28. The further the control element 28 is depressed (for example transition from the configuration shown in FIG. 3 to the configuration shown in FIG. 4), the larger the cross section of flow between the pressure tube port and the surroundings opened by the valve body 48.

The blocking member 42 and the ventilation valve 44 are jointly actuated by the operating element 26 (cf. FIG. 2). If the operating element 26 is actuated starting from its rest position, the blocking member, starting from the position shown in FIGS. 3 and 4, is moved such that it assumes the position shown in FIG. 5, i.e. such that the flow path between the suction port 30 and the lifting tube port 32 is closed off. Simultaneously, starting from the hold position, the ventilation valve is switched into the ventilation position (cf. transition from FIG. 4 to FIG. 5) by actuating the operating element 26.

In this respect, a mechanical forced coupling between the blocking member and the ventilation valve can be provided by the common operating element 26.

The operating device 20 comprises in particular a safety mechanism 50, which ensures that the ventilation valve 44 can only be shifted into the ventilation position when the control valve 46 is already adjusted into the open position.

The safety mechanism 50 can have a pivotable safety catch 52, which is arranged such that, in a blocking position, it blocks a shift of the ventilation valve 44. FIG. 3 shows the safety catch 52 in its blocking position. Starting from this blocking position, the safety catch 52 is pivotable such that the ventilation valve 44 is no longer blocked and can assume its ventilation position. This configuration of the safety catch 52 can be seen in FIGS. 4 and 5.

In order to provide this function, the safety mechanism 50 can have a movable coupling element 54 which, in the example shown, is formed as a connecting arm which interacts with the control element 28 at one end and with the safety catch 52 at the other end. When the control element 28 is actuated into its end position (cf. FIG. 4), the coupling element 54 is taken along therewith and pivots the safety catch 52 out of its blocking position.

This operating principle can be achieved, for example, by the coupling element having a slot 56 (cf. FIG. 4), within which a corresponding projection or pin extends, which projection or pin is arranged on the control element 28. The slot 56 is designed and arranged such that the projection or pin runs freely and abuts one end of the slot only in the end position, and the coupling element 54 is thus moved. In this respect, the safety catch 52 is moved out of the blocking position only when the control element 28 has been moved into its end position (cf. FIG. 5).

Owing to the joint actuation of the blocking member 42 and the ventilation valve 44 by means of the operating element 26, the blocking member 42 and the ventilation valve 44 overall form a discretely switchable ³⁄₂-way valve 58 (indicated in FIG. 5). Said valve functionally has three inlets, specifically the lifting tube port, the suction port and a fluid communication with the surroundings. The function of a ³⁄₂-way valve is provided by the coupled interaction between the blocking member 42 and the ventilation valve 44.

The control valve 46 is in particular not coupled to the ventilation valve 44 and can basically still be actuated by means of the control element 28 also in the situation shown in FIG. 5. As a result, the lifting tube 12 also remains controllable in the ventilation position.

The control valve 46, the blocking member 42 and finally the ventilation valve 44 are connected in series with respect to the flow path from the lifting tube port 32 through the channel 40 and further through the transverse hole 38 to the suction port 30. This is explained with reference to the functional diagrams in FIGS. 6 to 8. The flow path runs from the lifting tube 12 through the lifting tube port 32 along the control valve 46 and further along the blocking member 42 and along the ventilation valve 44 to the suction port 30, and finally and further into the suction grip device 16.

Figure 6:
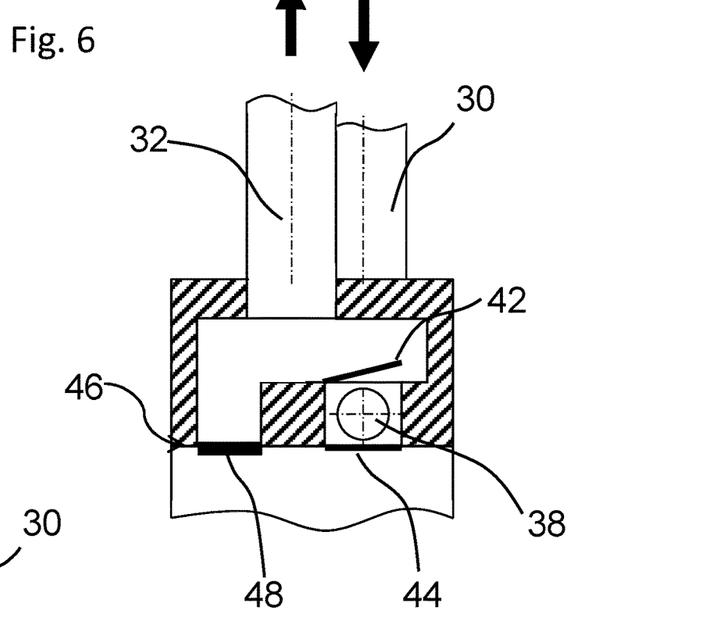
FIG. 6: is a functional diagram of the configuration according to FIG. 3.

In FIG. 6, the control valve 46 is in its closed position (valve body 48 closes the communication with the surroundings). The blocking member 42 is open, i.e. it opens the flow path. In contrast, the ventilation valve 44 is in its hold position, i.e. the flow path to the surroundings is closed off.

Figure 7:
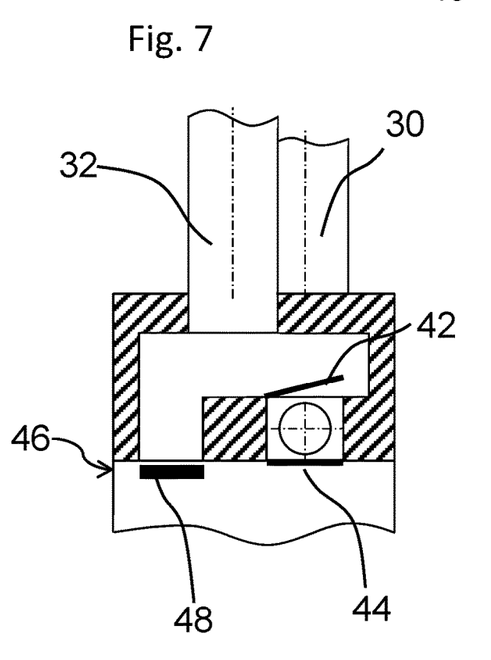
FIG. 7: is a functional diagram of the configuration according to FIG. 4.
Figure 8:
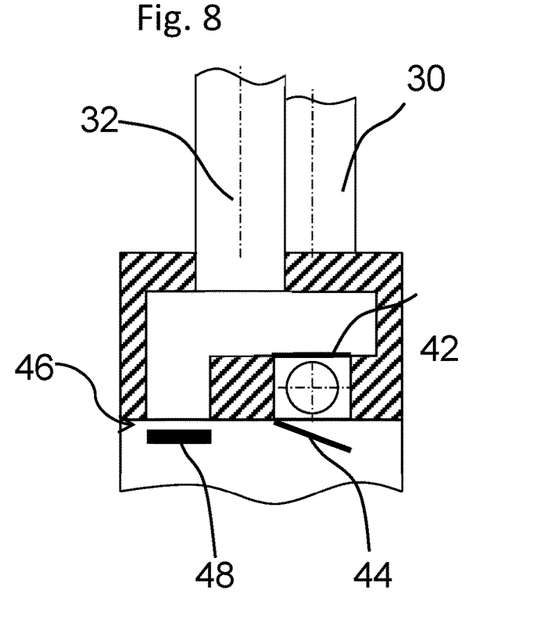
FIG. 8: is a functional diagram of the configuration according to FIG. 5.

Proceeding from this configuration, the control valve 46 can be opened (by actuating the control element 28, cf. FIGS. 3 to 5). As a result, ambient air passes into the lifting tube port 32. This configuration is shown in FIG. 7.

If the control valve 46 is completely open (cf. FIG. 8), the blocking member 42 can be closed (by actuating the common operating element 26). Owing to the coupling between the blocking member 42 and the ventilation valve 44, the ventilation valve 44 is simultaneously shifted into the ventilation position. This has the result that the suction port 30 is directly connected to the surroundings via the ventilation valve. As a result, the suction grip device 16 is ventilated. In contrast, the lifting tube port 32 is no longer connected to the suction port 30 due to the blocking member 42. An inflow of ambient air into the lifting tube port 32 can furthermore be controlled by means of the control valve 46.

What is claimed is:

1. Operating device for a tube lifter which comprises a lifting tube that has a tube interior and can be shortened by applying a vacuum to the tube interior, and comprising a suction grip device arranged on one end of the tube lifter, which suction grip device can be supplied with a vacuum through the tube interior, the operating device having a suction port for fluid communication with the suction grip device, a lifting tube port for fluid communication with the tube interior of the lifting tube, and a valve means for controlling the fluid communications, the valve means comprising:
a blocking member, which can assume various positions and, depending on its position, closes off or opens a flow path between the lifting tube port and the suction port;
a ventilation valve, which can be shifted into a hold position and into a ventilation position, in the ventilation position a flow path between the surroundings and the suction port being open, and in the hold position said flow path being substantially closed;
a control valve, which is adjustable between a closed position and an open position, in the open position a flow path from the surroundings to the lifting tube port being open, and in the closed position said flow path being substantially closed;

the valve means being designed such that the control valve is adjustable independently of the position of the blocking member, characterized in that the valve means is designed such that when the ventilation valve is shifted into the ventilation position the blocking member always closes off the flow path between the lifting tube port and the suction port.

2. Operating device according to claim 1, wherein a safety mechanism is provided which interacts with the control valve and the ventilation valve such that the ventilation valve can only be shifted into the ventilation position when the control valve is adjusted into the open position.

3. Operating device according to claim 1, wherein a common operating element for the blocking member and the ventilation valve is provided, wherein the operating element is manually actuable starting from a rest position and, upon actuation, the ventilation valve is shifted and the blocking member is moved simultaneously.

4. Operating device according to claim 3, wherein the operating element is mechanically blocked when the control valve is not adjusted into the open position.

5. Operating device according to claim 4, wherein a control element that is manually actuable between a neutral position and an end position is provided, wherein, when the control element is actuated starting from the neutral position toward the end position, the control valve is shifted from the closed position toward the open position, and wherein a safety catch that is pivotable or movable starting from a blocking position is provided, wherein the safety catch in the blocking position mechanically blocks the operating element, and wherein a coupling element is provided, which interacts with the control element and the safety catch in such a way that the safety catch is pivoted or moved out of its blocking position when the control element is adjusted into the end position.

6. Operating device according to claim 1, wherein the blocking member and the ventilation valve are mechanically intercoupled such that, by means of an adjustment of the ventilation valve into the ventilation position, the blocking member is shifted such that the flow path between the lifting tube port and the suction port is closed off.

7. Operating device according to claim 1, wherein the ventilation valve is provided by a discretely switchable valve.

8. Operating device according to claim 1, wherein the blocking member can be discretely switched into its two positions.

9. Operating device according to claim 1, wherein the valve means has a 3/2-way valve, which provides both the blocking member and the ventilation valve.

10. Operating device according to claim 1, wherein the valve means is designed such that the control valve can also be shifted into the open position when the blocking member closes off the flow path between the lifting tube port and the suction port.

11. Operating device according to claim 1, wherein the control valve, the blocking member and the ventilation valve are connected in series between the lifting tube port and the suction port.

12. Operating device according to claim 1, having a handle that can be grasped by an operator, wherein a common operating element for the blocking member and the ventilation valve is provided on the handle and wherein an actuable control element for adjusting the control valve is additionally provided on the handle.

13. Tube lifter comprising a lifting tube that comprises a tube interior, it being possible to shorten the lifting tube by applying a vacuum to the tube interior, and having a suction grip device connected to one end of the lifting tube, which suction grip device can be supplied with a vacuum through the tube interior, characterized by an operating device for operating the lifting tube comprising a lifting tube that has a tube interior and can be shortened by applying a vacuum to the tube interior, and comprising a suction grip device arranged on one end of the tube lifter, which suction grip device can be supplied with a vacuum through the tube interior, the operating device having a suction port for fluid communication with the suction grip device, a lifting tube port for fluid communication with the tube interior of the lifting tube, and a valve means for controlling the fluid communications, the valve means comprising:

a blocking member, which can assume various positions and, depending on its position, closes off or opens a flow path between the lifting tube port and the suction port;

a ventilation valve, which can be shifted into a hold position and into a ventilation position, in the ventilation position a flow path between the surroundings and the suction port being open, and in the hold position said flow path being substantially closed;

a control valve, which is adjustable between a closed position and an open position, in the open position a flow path from the surroundings to the lifting tube port being open, and in the closed position said flow path being substantially closed;

the valve means being designed such that the control valve is adjustable independently of the position of the blocking member, characterized in that the valve means is designed such that when the ventilation valve is shifted into the ventilation position the blocking member always closes off the flow path between the lifting tube port and the suction port.

\* \* \* \* \*